June 1, 1948.  C. E. BLALACK  2,442,637
CUTTING MEANS
Filed Sept. 25, 1944
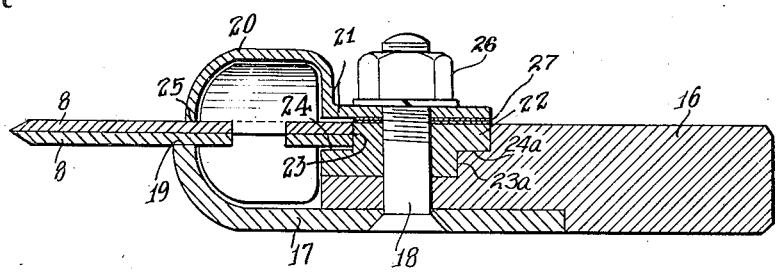
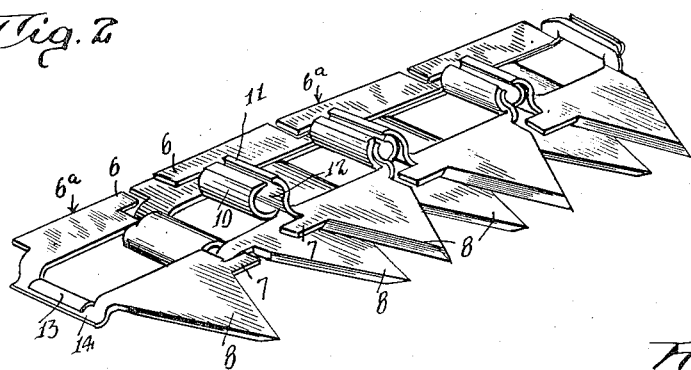
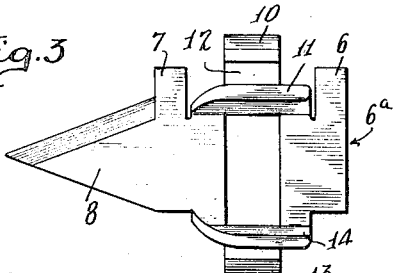
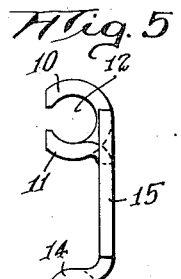
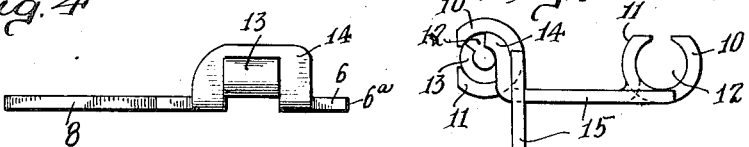
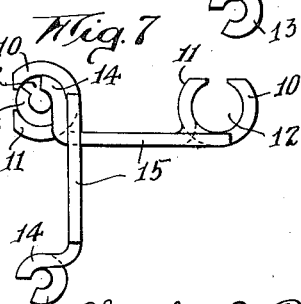
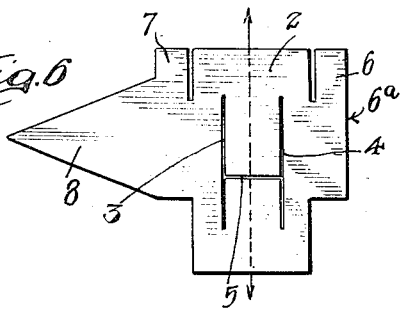
Inventor
Charles E. Blalack
By Lyon & Lyon
Attorneys Patented June 1, 1948

2,442,637

UNITED STATES PATENT OFFICE 2,442,637

CUTTING MEANS

Charles E. Blalack, Altadena, Calif.

Application September 25, 1944, Serial No. 555,647

9 Claims. (Cl. 56—297)

This invention relates to a cutting means intended to serve as a mower, and refers particularly to an endless chain of cutting means.

Mowers of the type having a stationary cutting bar and a reciprocating cutting bar have the disadvantage that they may not be operated at high speed without rapid destruction of these mowers. In my Patent No. 2,291,182, issued July 28, 1942, there is described a mower in which the cutter is formed of an endless chain, the individual links of which are provided with cutting blades and the two sides of the chain are positioned for cooperative cutting action. By the use of such an endless chain type of cutting means, it is possible to operate a mower at high speeds without excessive vibration.

It is the general object of the present invention to provide an improved cutting means of the endless chain type.

The improvements effected by the present invention are directed to providing an endless chain cutter by which the cutting blades of the two oppositely traveling sides of the chain may be held against each other in proper cutting relationship with less tendency for separation of the cutting blades in operation, and less tendency of the cutting blades to pivot. These improvements effected by the present invention are accomplished, while at the same time reducing the friction of the cutting links relative to each other and removing, or at least substantially reducing, the frictional wear upon the link portion of the cutter.

The cutting means of the present invention include a novel form of cutting link, which cutting link is characterized by being formed of a single plate of metal having a separate portion to form the cutter, a separate portion for forming the link of the chains, and separate portions designed to provide the cooperating bearing surfaces of said link. The cooperating bearing surfaces are of a new form, designed to reduce friction and to stabilize the relative positions of the cutter in operation.

The improved cutting means of the present invention is also characterized by the fact that it includes a novel type of holder for the endless chain, which holder is especially designed to provide bearing contact only with the bearing portions of the links of the chain, removing frictional contact from other portions. The holder is also designed to provide not only horizontal bearing surfaces but a vertical bearing surface for engagement with the cutting link, the combination of said horizontal and vertical bearing surfaces being responsible for the improved stability of the cutting means of the present invention in operation.

The cutting means of the present invention together with other advantages of the invention, will be apparent from a description of a preferred example of the cutting means embodying the present invention. I have therefore hereafter described a preferred example of the present invention in connection with the accompanying drawings, in which Fig. 1 is a vertical section through the endless chain and holder of the present invention;

Fig. 2 is a fragmentary perspective of the endless chain cutters;

Fig. 3 is a plan view of one of the links of the cutting chain;

Fig. 4 is a side view of one of the cutting links;

Fig. 5 is an end view of one of the cutting links looking toward the left of Fig. 3;

Fig. 6 is a plan view of a blank, illustrating the manner of forming the cutting link out of a single piece of plate metal; and Fig. 7 is an end view of two connecting links positioned at right angles to each other.

Referring first to Fig. 6 of the drawings, I have illustrated a blank of the type employed in forming one of the individual cutting links which form the endless chain cutter of the present invention. As illustrated, the blank comprises a rectangular center portion 2, which is cut vertically on the two parallel lines 3 and 4, and horizontally on the line 5. The horizontal cut 5 is positioned closer to the bottom end of the cuts 3 and 4 than to the top end of said cuts, and the cuts 3, 4, and 5 thus define two tongues of material which are to be bent to form a pin and eye of the cutting link, the relatively short tongue thus being formed at the bottom of the line 5, the relatively longer tongue at the top of the line 5.

A bearing strip 6 is provided at the right of the tongues and integrally with the portion 2, and a similar bearing strip 7 is provided at the left of the blank, also integral with the portion 2. A triangular blade or cutter section 8 integrally joins with the bearing strip 7 and it is the section 8 which is to be sharpened to form the cutting blade of the link. The edge 6a of the bearing portion 6 is a straight edge formed parallel with the intended line of movement of the cutting chain and is intended to form a vertical bearing surface, horizontal bearing surfaces being provided by the portions 6 and 7.

Now referring to Figs. 2 to 5, inclusive, (as well as to Fig. 6) in forming the eye of the link the top side of the portion 2 of the blank is curved upwardly as indicated at 10, the curvature being of a slightly S-shape and the relatively large tongue is pressed up as viewed in Fig. 6, and curved around a circle, as indicated at 11, so that the portions 10 and 11 form an eyelet or eye at the top side of the cutting link, having a substantially circular opening 12. At the bottom side of the blank as viewed in Fig. 6, a portion of the blank is curved upwardly along a similar S-shape curve, as indicated at 14, while the shorter tongue formed by the cuts 3, 5, and 4, as viewed in Fig. 6, is curved upwardly and around, as indicated at 13, so that the two portions 13 and 14 form a curved pin adapted to fit within and rotate within the opening 12 of an adjacent link.

In so bending the blank to form the pins and eyelets of the link as described, it is recommended that the portion 10 be given a curvature such that the flat portion of the link indicated at 15 shall be tangential to the curvature of the portion 10 since by so doing two of such cutting links may lay flat, one against the other, while the line of pull through the two sides of the chains of such links will be brought closely together, reducing the forces tending to separate the two dies of the chains.

To form a cutting chain, or the cutting means of the present invention, a plurality of links formed in the manner described are joined together to form an endless chain, fragmentarily illustrated in Fig. 2 of the drawings. Such an endless chain cutter may be operated in any usual or preferred manner, for example it could be substituted for the endless chain cutters in the mechanism described in my previously identified patent. The cutting means of the present invention, however, also include an improved type of holder for holding the two sides of such an endless chain in the proper cooperating position. As indicated in Fig. 1, such a holder comprises a mounting bar 16 which in turn may extend parallel with the endless cutting chain and for substantially the length of the cutting chain. A lower holding member 17 is provided which extends substantially the length of the mounting bar 16 and has a rear portion fitted within a recess in the mounting bar 16, the holding member 17 and the mounting bar 16 being held together by bolts such as indicated at 18. The holding member 17 is curved upwardly to position its edge 19 in a horizontal plane so that its edge 19 may serve as a horizontal bearing surface. An upper holding member 20 is formed likewise extending the length of the mounting bar 16 and holding member 17, and has its rear end bent downwardly and then rearwardly, as indicated at 21, to receive the head 26 of the bolt 18. Beneath the portion 21 is provided a bearing member 22 fitting within recesses in the mounting bar 16, and this bearing member 22 has a vertical bearing face 23 which extends vertically to the intended line of movement of the cutting link through the holder. There is also provided a horizontal bearing face 24 on the bearing member 22.

The holding member 20 has its forward end curved downwardly to bring its edge 25 into a horizontal position to provide a horizontal bearing surface aligned with but spaced from the bearing surface 19.

In practice, the cutting links of the endless chain have their link portion received between the holding members 17 and 20. The bearing face 19 contacts the bearing portions 7 of the lower cutting links and the bearing surface 25 similarly contacts the bearing portion 6 of the upper cutting links. Space is provided for clearance between the body of the link and the holding members 17 and 20. The vertical bearing edges 6a of both the upper and lower links are in bearing contact with the vertical bearing face 23 of the bearing member 22. This contact results from the backward pressure exerted upon the cutting edge when the machine is in operation and moving in a forward direction. This contact prevents the link from pivoting in a horizontal plane, which would cause binding of the links within the holding members. The bearing face 6 of the upper link is in contact with the portion 21 of the upper holding member 20 and bearing face 6 on the lower cutting link is in contact with the portion 24 of the holding member 22. As indicated, shims 27 may be placed between member 22 and the upper holding member 21 in order to secure the desired fit of the links with respect to the bearing faces described.

The member 22 is indicated as having bearing surfaces 23a and 24a complementary to the bearing surfaces 23 and 24 so that when the surfaces 23 and 24 become worn, by turning the member 22 upside down as viewed in Fig. 1, the bearing surfaces 23a and 24a are available as new, unworn bearing surfaces.

It will accordingly be seen that the endless chain cutters may move through the holder without contact between the cutters and the holder, except at specially designed bearing surfaces. Forward and rearward horizontal bearing surfaces are provided, as well as a vertical bearing surface, which in practice are capable of maintaining the two sides of the cutting chains in firm contacting relationship without allowing pivoting or separation thereof. Wear of the link portions of the chain is reduced through elimination of contact between the chain and the holder with the result that the chain may move through the holder with less friction and with less wear.

This invention is not limited to the particular examples shown for the purpose of illustrating the invention, but includes such modifications and changes as come within the scope of the appended claims.

I claim:

1. A link for an endless chain cutter of a harvester, said link being formed of a metal plate and having a cutting blade portion, a link portion, and bearing portions, one bearing portion being disposed between the cutting portion and link portion, and the other bearing portion being disposed at the opposite side of the link portion from the cutting portion, the link portion having a central opening for receiving a sprocket pin, and tongues formed in said opening of the link portion bent to form eyes and pins for said link portion.

2. A cutting link for an endless chain cutter comprising a single blade of metal, having a triangular shaped cutting portion, a link portion, bearing portions, one disposed between the link portion and the triangular cutting portion, and the other disposed at the opposite side of the link portion, the link portion having a central aperture with tongues formed at the margins of said aperture and curved to form the eyes and pins of the link portion.

3. A cutting link for an endless harvester chain, said cutting link comprising a rectangular portion having two parallel spaced central cuts and an intermediate transverse cut forming tongues, the ends of said rectangular portion and said tongues being curved to provide eyes and pins, bearing surfaces connected to opposite sides of said rectangular portion, and a triangular cutting portion extending from one of said bearing portions.

4. A cutter for an endless harvester chain including a substantially rectangular portion having two substantially parallel and an intermediate transfer cut forming a relatively long and a relatively short tongue, the ends of said rectangular portion and said tongues being bent to form an eye and a pin, a bearing portion connected to said rectangular portion and formed to provide both horizontal and vertical bearing surfaces, a second bearing portion on the opposite side of said rectangular portion and a triangular cutting portion joined to said latter bearing portion.

5. An endless chain cutting means for a harvester which includes a chain cutter formed of cutting links, each including a link forming portion having a separate bearing portion at the front and the rear thereof, the front bearing portion joined with a triangular cutting portion, and a holder for maintaining the cutting links in cooperating cutting action, said holder comprising an upper and a lower holding member, said upper and lower holding members being formed to provide horizontal bearing contact with the cutting links only on said bearing surfaces thereof, said holding means also including means providing a rectangular bearing surface forming bearing contact with the rear bearing portions of said cutting links.

6. A cutting means of the class described, which includes a cutting chain having its two sides positioned for cooperative cutting action, said chain being formed of cutting links having link forming portions disposed between horizontal bearing surfaces, said cutting links also having triangular shaped cutting portions extending from one of said bearing surfaces, a holder for maintaining said cutting links in cooperating cutting relationship, said holder including an upper member and a lower member, said upper and lower members having bearing contact with the cutting links only on said bearing surfaces thereof.

7. A link for an endless chain cutter, comprising a link portion having a central opening for receiving a sprocket pin, a pin at one end and an eye at the other end of said link portion, bearing portions joined to the sides of said link portion and extending laterally beyond the pins and eyes thereof, and a cutting blade joined to one of said bearing portions.

8. A link for an endless chain cutter, comprising a link portion having a central opening for receiving a sprocket pin, said link portion having a pin and an eye at its opposite ends, a bearing surface extending on each side of said link beyond said pins and eyes, and a cutting blade extending from one of said bearing portions.

9. A cutting link for an endless chain cutter, comprising a link portion having a central aperture with tongues formed at the margins of said apertures and curved to form an eye and a pin at the opposite ends of the link portions, a bearing portion at each side of the link portion, and a cutting blade joined to said bearing portion.

CHARLES E. BLALACK.

REFERENCES CITED

The following references are of record in the file of this patent:

UNITED STATES PATENTS

| Number | Name | Date |
|---|---|---|
| 1,280,223 | Higgins | Oct. 1, 1918 |
| 2,291,182 | Blalack | July 28, 1942 |